(12) United States Patent
Decoster et al.

(10) Patent No.: US 11,305,221 B2
(45) Date of Patent: Apr. 19, 2022

(54) AIR FILTER SYSTEM, AIR FILTER ELEMENT FOR USE IN SAME, AND METHOD FOR SERVICING SAME

(71) Applicant: Donaldson Company, Inc., Minneapolis, MN (US)

(72) Inventors: Kristof Decoster, Vilvoorde (BE); Bart Catoor, Kessel-lo (BE); Mathijs Verstraete, Tienen (BE)

(73) Assignee: Donaldson Company, Inc., Minneapolis, MN (US)

( * ) Notice: Subject to any disclaimer, the term of this patent is extended or adjusted under 35 U.S.C. 154(b) by 167 days.

(21) Appl. No.: 16/497,103

(22) PCT Filed: Mar. 23, 2018

(86) PCT No.: PCT/US2018/024123
§ 371 (c)(1),
(2) Date: Sep. 24, 2019

(87) PCT Pub. No.: WO2018/175950
PCT Pub. Date: Sep. 27, 2018

(65) Prior Publication Data
US 2021/0113949 A1 Apr. 22, 2021

Related U.S. Application Data

(60) Provisional application No. 62/476,027, filed on Mar. 24, 2017.

(51) Int. Cl.
*B01D 46/00* (2006.01)
*B01D 46/42* (2006.01)
*B01D 46/52* (2006.01)

(52) U.S. Cl.
CPC ..... *B01D 46/0005* (2013.01); *B01D 46/4227* (2013.01); *B01D 46/525* (2013.01);
(Continued)

(58) Field of Classification Search
CPC ............ B01D 46/0005; B01D 46/4227; B01D 46/525–527; B01D 2265/024; B01D 2265/028; B01D 2271/027
(Continued)

(56) References Cited

U.S. PATENT DOCUMENTS

| | | |
|---|---|---|
| 3,025,963 A | 3/1962 | Bauer |
| 5,895,574 A | 4/1999 | Friedmann et al. |

(Continued)

FOREIGN PATENT DOCUMENTS

| | | |
|---|---|---|
| CN | 104039421 A | 9/2014 |
| CN | 104203370 A | 12/2014 |

(Continued)

OTHER PUBLICATIONS

Office Action Corresponding to China Patent Application 201880019286.4, dated Apr. 6, 2021.
(Continued)

*Primary Examiner* — Robert Clemente
(74) *Attorney, Agent, or Firm* — Merchant & Gould P.C.

(57) ABSTRACT

The present disclosure is directed towards filter elements whose overall length can be adjusted such that the filter element can be installed through an opening in an air cleaner opening having a relatively smaller dimension than the maximum dimension of the filter element. In one aspect, the filter element can include a radial seal member disposed on a positionable coupling element circumscribing at least a portion of a filter medium pack. The filter element has a first axial length when the positionable coupling element is in an extended position and has a second axial length when the positionable coupling element is in a collapsed position, wherein the first axial length is greater than the second axial length. In some examples, the filter element includes two positionable coupling elements.

20 Claims, 9 Drawing Sheets

(52) U.S. Cl.
CPC .. *B01D 2265/024* (2013.01); *B01D 2265/028* (2013.01); *B01D 2271/027* (2013.01)

(58) Field of Classification Search
USPC ......................................................... 55/496
See application file for complete search history.

(56) References Cited

U.S. PATENT DOCUMENTS

| | | | |
|---|---|---|---|
| 6,416,605 B1 | 7/2002 | Golden | |
| 7,981,183 B2 | 7/2011 | Nepsund et al. | |
| 9,162,172 B2 | 10/2015 | Nepsund et al. | |
| 2008/0115474 A1 | 5/2008 | Volkmer | |
| 2008/0236121 A1 | 10/2008 | Volkmer et al. | |
| 2010/0132321 A1 | 6/2010 | Nepsund et al. | |
| 2011/0314781 A1* | 12/2011 | Greist .................... | B01D 46/42 55/496 |
| 2014/0102057 A1 | 4/2014 | Nepsund et al. | |

FOREIGN PATENT DOCUMENTS

| | | |
|---|---|---|
| CN | 105413300 A | 3/2016 |
| DE | 19532437 A1 | 3/1997 |
| DE | 10135690 A1 | 2/2003 |
| WO | 2016/030037 A1 | 3/2016 |
| WO | 2010117799 | 10/2020 |

OTHER PUBLICATIONS

International Search Report and Written Opinion for PCT/US2018/024123, dated Jun. 11, 2018.

\* cited by examiner

FIG. 12C

AIR FILTER SYSTEM, AIR FILTER ELEMENT FOR USE IN SAME, AND METHOD FOR SERVICING SAME

RELATED APPLICATIONS

This application is a National Stage Application of PCT International Application No. PCT/US2018/024123, filed on Mar. 23, 2018, which claims the benefit of priority to U.S. Provisional Patent Application Ser. No. 62/476,027 filed on Mar. 24, 2017, which applications are incorporated herein by reference. To the extent appropriate, a claim of priority is made to each of the above disclosed applications.

TECHNICAL FIELD

The present invention pertains to air filter systems and to air filter elements for use in such systems, and method for servicing such air filter systems.

BACKGROUND

U.S. Pat. No. 9,162,172 B2 discloses an air cleaner including a housing and an access cover. The internal volume of the housing can be reached through an opening in a side wall of the housing. A filter element having fluted filter media is removable and replaceable from the air cleaner. The housing is constructed and arranged to cam the element into sealing engagement with the housing. A method of installing the filter element in the air cleaner includes sliding a portion of the filter element against a slide surface in the housing. A method of servicing an air cleaner includes tilting the filter element against a tilt surface in the housing to release a seal between the filter element and the housing. The filter element can have a handle to assist in servicing of the air cleaner. The housing can have an inspection window to allow visual inspection of the internal component of the housing and to determine visually whether a filter element is installed therein.

It is a disadvantage of traditional air filter systems that an access path must be provided that is at least as big as the corresponding dimension of the air filter element that is inserted and removed through it. This does not only imply that an opening of sufficient size must be present in the housing of the air filter system itself, but also that the surrounding components—which are typically closely spaced in an automotive context—must be arranged so as to allow passage of the filter element.

SUMMARY

It is an object of embodiments of the present invention, that the air filter element can pass through an insertion/removal path or system housing opening that has smaller dimensions that the corresponding dimension of the air filter element in its operational state.

It is an object of embodiments of the present invention, that the same air filter element may be used in a variety of air filter systems, regardless of whether these systems are designed to be serviced frontally, laterally, or from the top.

According to an aspect of the present invention, there is provided an air filter element comprising: a filter medium pack comprising a filter medium, the filter medium pack having an air inlet side and an air outlet side; a first coupling element arranged on the air inlet side and a second coupling element arranged on the air outlet side, wherein sealing means configured to cooperate with a sealing surface of an air filter system housing are provided on at least one of the first coupling element and the second coupling element; wherein the air filter element is configured to allow relative movement of the first coupling element and the second coupling element between a shortened position and an extended position.

Each coupling element may comprise a flange, a ring, an end portion of the filter medium pack or of a shell attached thereto, one or more tabs, one or more grooves, or the like, for example for keeping the part of the air filter element to which it belongs in a fixed place inside the air filter system.

It is an advantage of the air filter element according to the present invention that it can be shortened when it is not in use, and thus made to fit through a smaller opening or passage. In use, it must take on its extended position to ensure a proper fit of the inlet and/or outlet seals, in which position it is kept by cooperation between suitably designed rigid elements of the air filter element and cooperating elements of the housing into which the air filter element is installed.

In an embodiment, the air filter element according to the present invention further comprises a reversibly deformable collar arranged between the air outlet side of the filter medium pack and the second coupling element, the reversibly deformable collar having a first diameter at the air outlet side and a second diameter at the second coupling element, the second diameter being greater than the first diameter; wherein folding a first part of the reversibly deformable collar having a greater diameter over a second part of the reversibly deformable collar having a smaller diameter enables the relative movement of the first coupling element and the second coupling element.

The reversibly deformable collar may be "substantially frustoconical", in the sense that is has a shape having a circular, elliptical, or obround symmetry and a diameter (or diameters) that increases from one end to the other along its axis. It may be composed of one or more frustoconical section having the same or different rates of diameter increase, optionally connected to each other by cylindrical components.

The inventors have found that a reversibly deformable collar, preferably made out of an elastomer or silicone-type material, is a particularly suitable way of providing the capability of lengthening and shortening the air filter element without any loss of air-tightness. It is a further advantage of this embodiment that the collar can be shaped so as to be stable in both its folded position and in its extended position, thus requiring no external longitudinal force to keep it folded (during storage or servicing) or to keep it extended (when in use).

In an embodiment, the air filter element according to the present invention further comprises a reversibly deformable collar arranged between the air outlet side of the filter medium pack and the second coupling element, the reversibly deformable collar having a first diameter at the air outlet side and a second diameter at the second coupling element, the second diameter being smaller than the first diameter; wherein folding a first part of the reversibly deformable collar having a smaller diameter under a second part of the reversibly deformable collar having a greater diameter enables the relative movement of the first coupling element and the second coupling element.

This embodiment provides an alternative to the arrangement of the previously described embodiment, with the same advantages.

In an embodiment, the air filter element according to the present invention further comprises a bellows arranged between the first coupling element and the second coupling element, the bellows enabling the relative movement of the first coupling element and the second coupling element.

It is an advantage of this embodiment that it provides an extension solution that is relatively simple to implement in an air-tight manner, and that the bellows may be arranged at any suitable place between the opposite ends of the air filter element.

In a particular embodiment, the air filter element comprises a main body between the first coupling element and the second coupling element, and the bellows is arranged between the first coupling element and the main body.

In an alternative particular embodiment, the air filter element comprises a main body between the first coupling element and the second coupling element, and the bellows is arranged between the second coupling element and the main body.

In a further alternative particular embodiment, the air filter element comprises a main body between the first coupling element and the second coupling element, and the bellows is arranged between axially separated parts of said main body.

In an embodiment, the air filter element according to the present invention further comprises a telescopic arrangement arranged between the first coupling element and the second coupling element, the telescopic arrangement enabling the relative movement of the first coupling element and the second coupling element.

It is an advantage of this embodiment that it provides an extension solution that can allow relatively large length differences between the shortened position and the extended position.

In an embodiment of the air filter element according to the present invention, the sealing means comprises a radial seal arranged on the second coupling element.

As the radial seal extends in a direction having a component perpendicular to the direction of the air flow, it is an advantage of this embodiment that the interaction between the sealing means and the sealing surface of the housing generates no force component in a direction that counteracts the extension of the air filter element.

In an embodiment, the air filter element according to the present invention further comprises guiding means configured to cooperate with the air filter system housing so as to at least partially bring the air filter element from its shortened position into the extended position during the insertion of the air filter element into the air filter system housing.

It is an advantage of this embodiment that it ensures that the air filter element is in its extended position when it reaches its intended position inside the air filter system housing.

In a particular embodiment, the air filter element further comprises gripping means arranged for transmitting a manual force to a part of said air filter element that is not brought into its extended position by said guiding means, so as to fully bring the air filter element into the extended position.

In an embodiment, the air filter element according to the present invention further comprises an operable latch member or latching means (e.g. see 138 at FIGS. 12A-12C) configured to cooperate with the air filter system housing so as to latch the air filter element in the extended position when the air filter element is installed in the air filter system housing.

It is an advantage of this embodiment that it avoids unintentional shortening or retraction of the air filter element, which could break the sealing of the air path, when it is in its installed position.

According to an aspect of the present invention, there is provided an air filter system comprising a housing and a removable air filter element as described above; wherein the housing comprises a sealing surface configured to engage with the sealing means so as to provide a sealed fluid communication between air outlet side of the air filter element and a clean air channel of the air filter system; and wherein the housing is configured to cooperate with the guiding means to bring the air filter element from its shortened position into the extended position during the insertion of the air filter element into the air filter system housing and/or with the latching means of the air filter element to latch the air filter element in the extended position.

According to an aspect of the present invention, there is provided a method of servicing an air filter system having a service opening, the method comprising: inserting an air filter element as described above, initially in the shortened position, through the service opening; extending the air filter element to its extended position during or after the inserting; and operating the latching means to latch the air filter element in the extended position when it is fully inserted in the air filter system.

In one example of the present invention, a filter element includes a filter medium pack including a filter medium and having an air inlet side and an air outlet side. The filter element can include a radial seal member disposed on a positionable coupling element circumscribing at least a portion of the filter medium pack. In one aspect, the filter element has a first axial length when the positionable coupling element is in an extended position and has a second axial length when the positionable coupling element is in a collapsed position, wherein the first axial length is greater than the second axial length.

In an embodiment, the air filter element according to the present invention, the filter element further comprises a second radial seal member disposed on a second positionable coupling element circumscribing at least a portion of the filter medium.

In an embodiment, the air filter element according to the present invention, the filter element radial seal member includes one or more radially extending lip seals.

In an embodiment, the air filter element according to the present invention, the filter element further includes a radially protruding tab arranged on the positionable coupling element that is for engaging with a portion of an air cleaner housing to move the positionable coupling element from the compressed position to the extended position.

In an embodiment, the air filter element according to the present invention, the filter element radially protruding tab includes a pair of radially protruding tabs.

In an embodiment, the air filter element according to the present invention, the filter element further includes an operable latch member for moving the positionable coupling element from the compressed position to the extended position.

The technical effects and advantages of embodiments of the air filter system and of the method according to the present invention correspond mutatis mutandis to those of the corresponding embodiments of the air filter element according to the present invention.

BRIEF DESCRIPTION OF THE FIGURES

These and other features and advantages of embodiments of the present invention will be described in more detail with reference to the attached drawings, in which.

Throughout the figures, like reference numbers have been used to designate identical of functionally similar elements.

DESCRIPTION OF EMBODIMENTS

Air filter systems are provided in many mechanical systems to clean the air that is supplied to an air consuming component, such as internal combustion engine. An air filter element is a replaceable component of such an air filter system, in which a filter medium catches particles and impurities that are present in the incoming air flow. In the Figures, the flow path of the unclean (unfiltered) air is schematically indicated by a gray arrow, while the flow path of the clean (filtered) air is schematically indicated by a white arrow.

The present invention may be implemented with different kinds of filter medium packs, including filter medium packs comprising pleated filter media and filter medium packs comprising fluted filter media, also known as Z-type media, which may be layered by rolling a length of fluted sheets or stacked multiple fluted sheets. Various types of pleated filter medium packs are commercially available and known to the skilled person. Fluted filter medium packs include filter material having a plurality of flutes formed therein having alternating ends of adjacent flutes closed to force fluid through filter material. Various types of fluted filter media are commercially available and known to the skilled person. A filter medium pack of the fluted filter media type or z-type media is known to the skilled person. For example, some types of fluted filter media are known from U.S. Pat. No. 3,025,963 to Jordan V. Bauer, U.S. Pat. No. 5,895,574 to Francis Friedmann et al., U.S. Pat. No. 6,416,605 to Patrick Golden, and from US patent application publication no. US 2014/0102057 A1.

Figure 1:
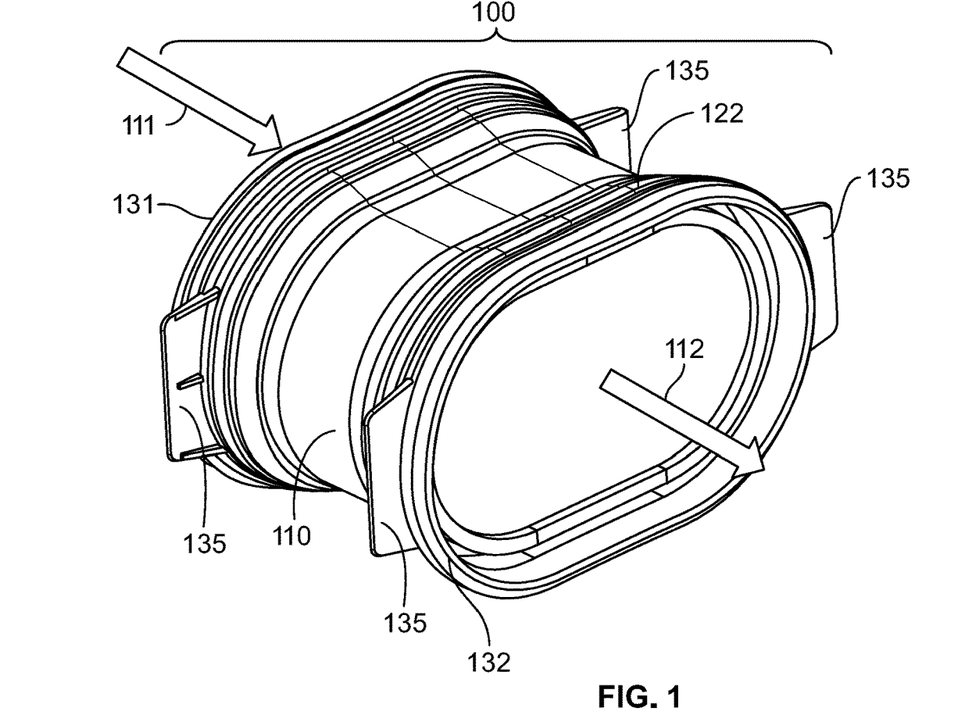
FIG. 1 presents a perspective view of a first embodiment of the air filter element according to the present invention, also referred to as the "frustoconical collar embodiment"
Figure 2:
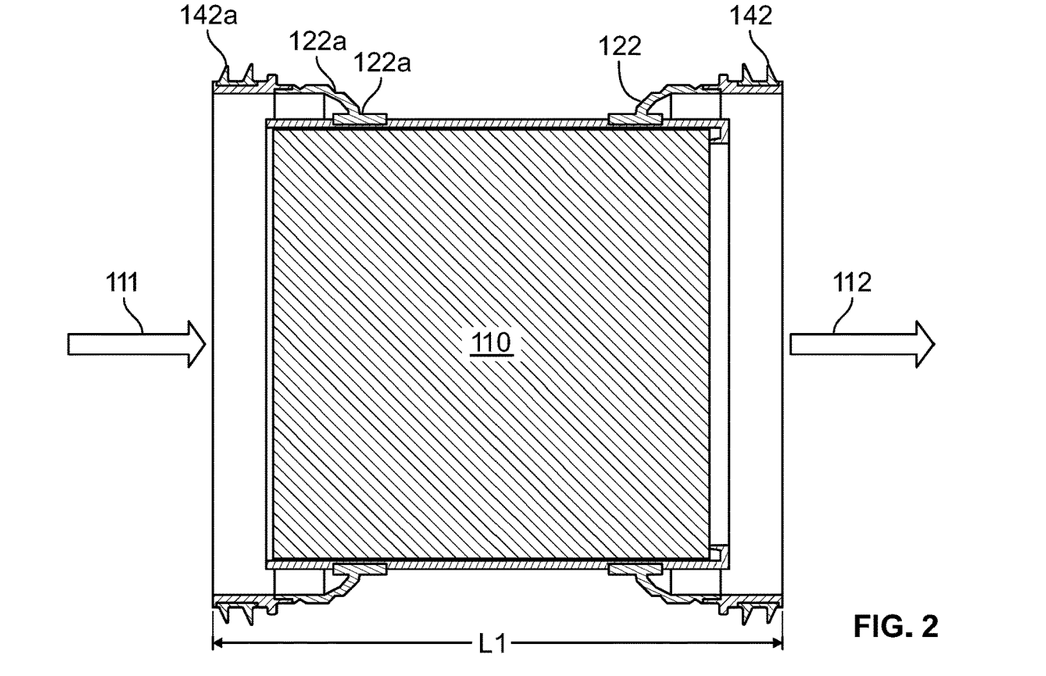
FIG. 2 presents a cross-section of the air filter element of FIG. 1.

FIGS. 1 and 2 present an air filter element 100 according to a first embodiment of the present invention. The illustrated air filter element 100 comprises a filter medium pack 110 comprising a filter medium, the filter medium pack 110 having an air inlet side 111 (i.e., defining an inflow surface) and an air outlet side 112 (i.e., defining an outlet surface). The filter medium pack 110 may be sufficiently rigid to give the air filter element 100 the necessary dimensional stability, or it may be provided with a hard outer shell, e.g. a plastic shell, which may cover all or part of the axial extent of the air filter element 100.

A first coupling element 132 is arranged on the air inlet side 111 and a second coupling element 132 is arranged on the air outlet side 112. Sealing means 142 configured to cooperate with a sealing surface of an air filter system housing 200 (not illustrated) are provided on at least one of the first coupling element 131 and the second coupling element 132. In one aspect, the first and second coupling elements 131, 132 are axially positionable between first and second positions to alter the overall length of the filter element 100. In one aspect, sealing means 142 can be characterized as a sealing member 142. In the example shown at FIGS. 1 and 2, the sealing means 142 includes a pair of circumferential, radially extending lip seals 142a at each of the first and second coupling elements 132. In one aspect, the sealing means 142 may be formed from an injection molded thermoplastic elastomer (TPE).

Figure 2A:
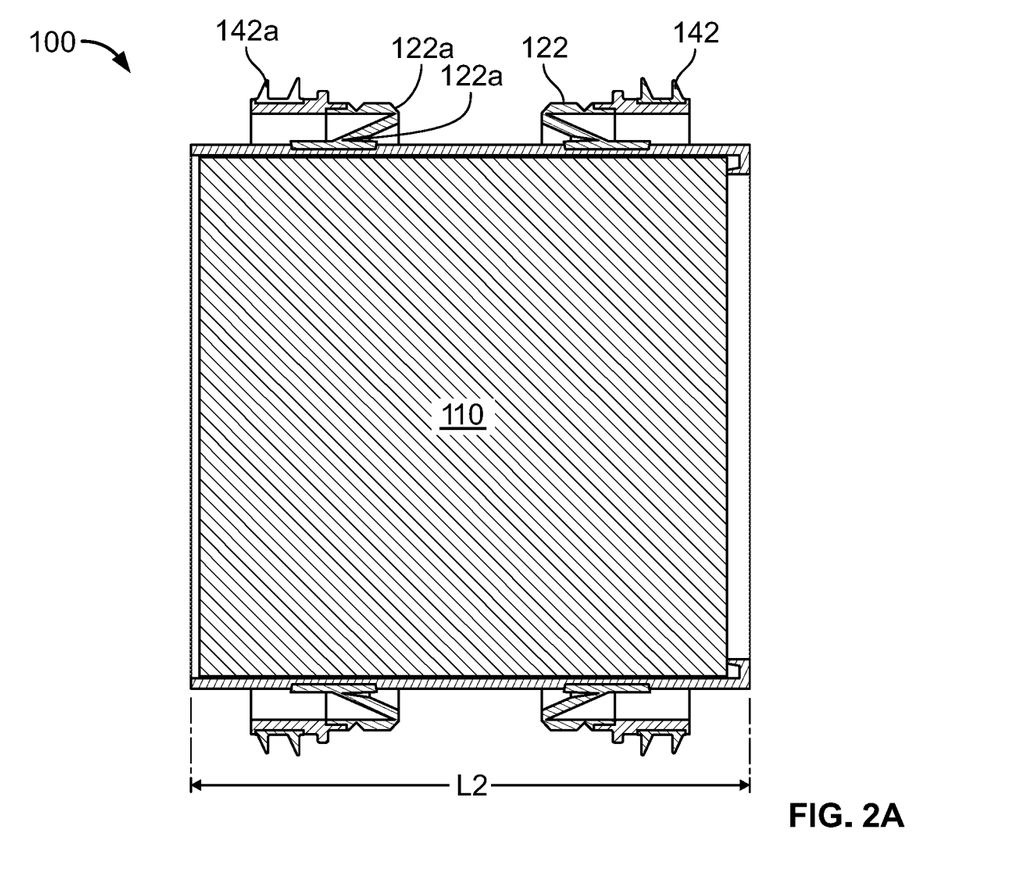
FIG. 2A presents a cross-section of the air filter element of FIG. 1, with deformable collars of the air filter element placed in a collapsed position.

According to the invention, the air filter element 100 is configured to allow relative movement of the first coupling element 131 and the second coupling element 132 between a shortened position and an extended position. As illustrated at FIGS. 2 and 2A, the filter element can have a first axial length L1 when the positionable coupling element(s) 131 and/or 132 are in an extended position and has a second axial length L2 when the positionable coupling element(s) 131 and/or 132 are in a collapsed position, wherein the first axial length L1 is greater than the second axial length L2. In the illustrated embodiment, each coupling element comprises a ring with radially or outwardly protruding tabs 135. A reversibly deformable collar 122 is arranged between the outlet side 112 of the filter medium pack 110 and the second coupling element 132; it must be noted that the same arrangement may be provided between the inlet side 111 of the filter medium pack and the first coupling element 131, as illustrated. The or each reversibly deformable collar has a first diameter at the outlet side 112 and a second diameter at the second coupling element 132, the second diameter being greater than the first diameter. The shape of the collar allows the collar to be collapsed by folding a first part of the reversibly deformable collar having a greater diameter over a second part of the reversibly deformable collar having a smaller diameter. Considering without loss of generality the reversibly deformable collar 122 shown at the right-hand side of FIG. 2, the cylindrical portions and the forward slanting (/) portion at the top of the figure would collapse into an approximate S-shape when folded, while the cylindrical portions and the backward slanting (\) portion at the bottom of the figure would collapse into an approximate Z-shape when folded. In the example shown, the deformable collar 122 is provided with reduced thickness areas that function as living hinges 122a that facilitate the deformable collar 122 to be collapsed. As the deformable collar 122 is formed from a deformable polymeric material, the portions of the collar outside of the living hinges 122a are also bendable or deformable. The collapsed position is illustrated in the schematic view presented at FIG. 2A in the drawings.

This "collapsing" or folding of the collar at the air outlet side 112 enables the movement of the first coupling element 131 relative to the filter medium pack, and thus allows the relative movement between the first coupling element 131 and the second coupling element 132. The same applies, mutatis mutandis, at the air inlet side 111 if a reversibly deformable collar is provided there as well. By "collapsing" the collar or collars, the total length of the air filter element 100 as measured between the first coupling element 131 and the second coupling element 132 is reduced from a first axial length (extended position) to a second axial length (collapsed position), thus shortening the overall length of the air filter element 100.

Preferably, the air filter element 100 further comprises guiding means configured to cooperate with the air filter system housing 200 so as to bring the air filter element 100 from its shortened position into the extended position during the insertion of the air filter element into the air filter system housing. In the illustrated case, the outward facing tabs 135 of the coupling elements 131, 132 may slide into corresponding slanted grooves provided in the air filter system housing 200, ensuring that the coupling elements 131, 132 are pulled away from each other longitudinally, thus unfolding the reversibly deformable collar or collars and extending the air filter element 100 to the required length for an air tight fit.

The sealing means preferably comprises a radial seal arranged on the second coupling element 132. It is an advantage of a radial seal that its engagement with the sealing surface is not affected by forces acting in the axial direction.

In its installed position and in normal operation, various forces may operate on the filter medium pack 110, including gravitational forces (the pack's own weight) and inertial forces (e.g. due to vibrations of the engine, and accelerations or decelerations of the vehicle in which the air filter system is mounted). If these forces are transmitted to the coupling elements 131, 132, in particular to the coupling element(s) that are provided with sealing means, these forces may adversely affect the tightness of the seal or even cause the seal to disengage. It is a particular advantage of this first embodiment that the coupling elements 131, 132 are attached to the filter medium pack 110 by reversibly deformable means, thus reducing the transmission of forces acting on the filter medium pack 110 to the coupling elements 131, 132.

The air filter element 100 may further comprise latching means configured to cooperate with the air filter system housing 200 so as to latch the air filter element 100 in the extended position when the air filter element 100 is installed in the air filter system housing 200.

Figure 3:
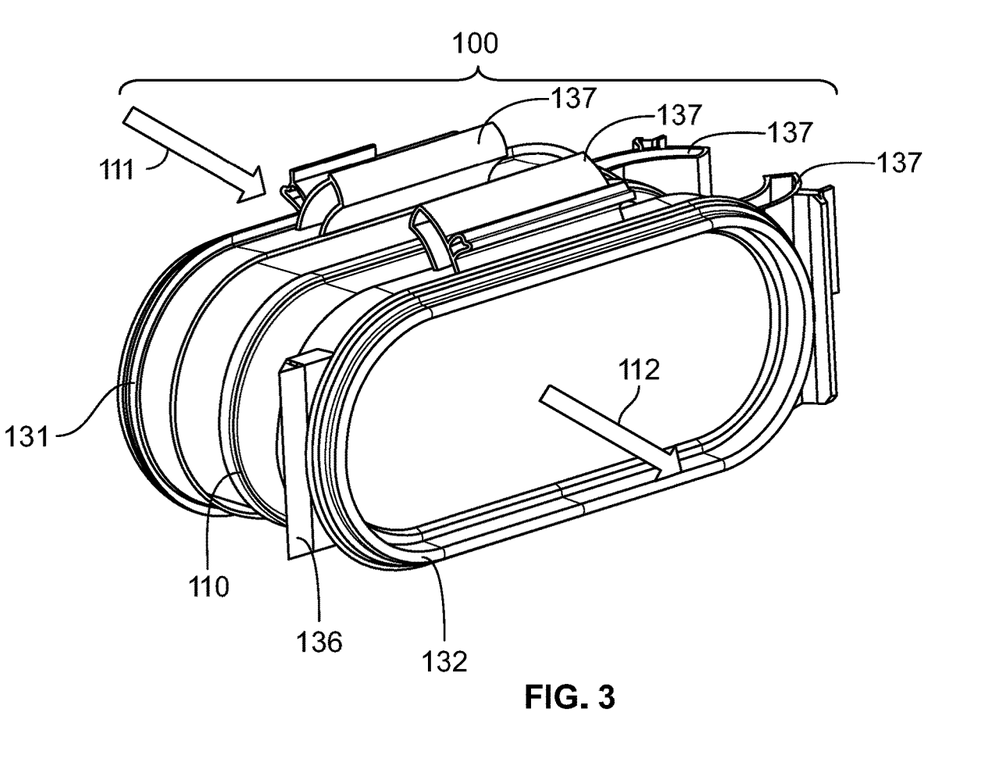
FIG. 3 presents a perspective view of a second embodiment of the air filter element according to the present invention, also referred to as the "fold embodiment"
Figure 4:
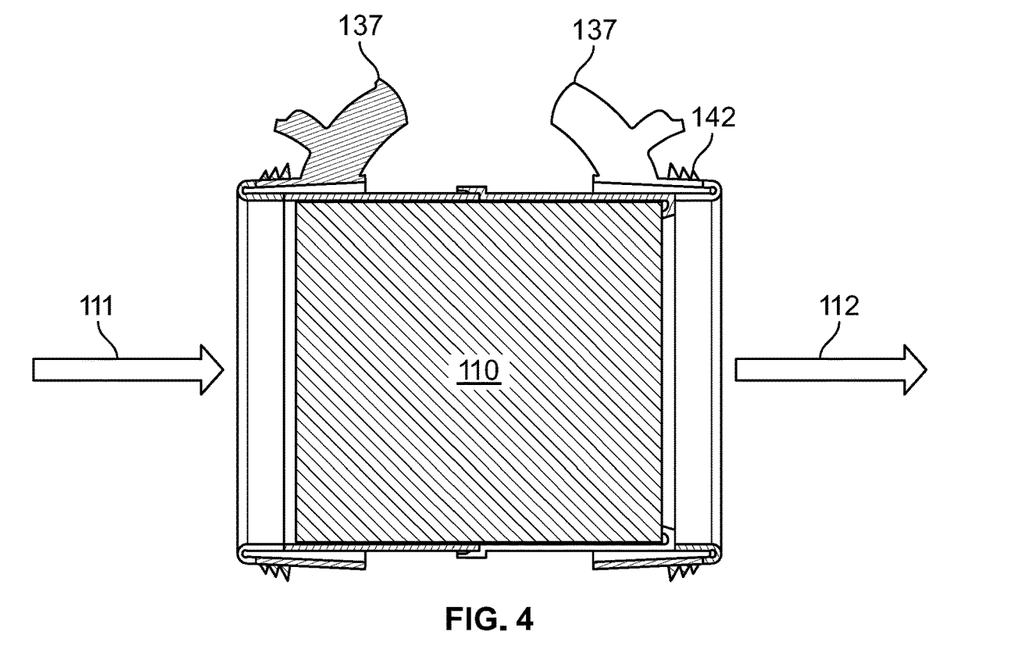
FIG. 4 presents a cross-section of the air filter element of FIG. 3.

FIGS. 3 and 4 present an air filter element 100 according to a second embodiment of the present invention. For reasons of conciseness, only the differences with the first embodiment will be described hereinafter.

In this embodiment, the coupling elements 131, 132 are formed by the ring-shaped frontal surfaces of back-folded reversibly deformable end sleeves. A combination of a tab 136 and grips 137 on various sides of the air filter element 100 allow the user to bring the air filter element 100 to the required length for an air tight fit when the air filter element 100 is being inserted into the air filter system housing 200, by forcing the fold fronts to move into the direction that extends the air filter element 100. By providing a judicious placement of these tab(s) 136 and grips 137, the air filter element 100 may be used with different types of air filter systems having different servicing directions. The required length for a proper fit in different types of air filter systems may vary, and these varying lengths can be accommodated by the same air filter element 100.

Figure 5:
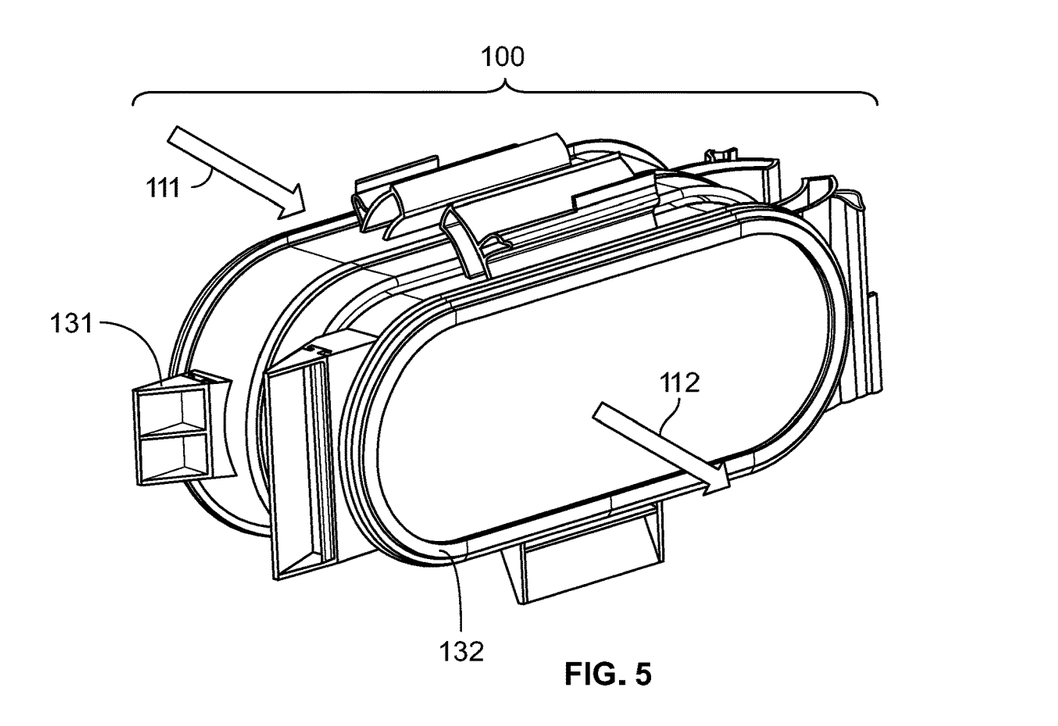
FIG. 5 presents a perspective view of a third embodiment of the air filter element according to the present invention, also referred to as the "hinge embodiment"
Figure 6:
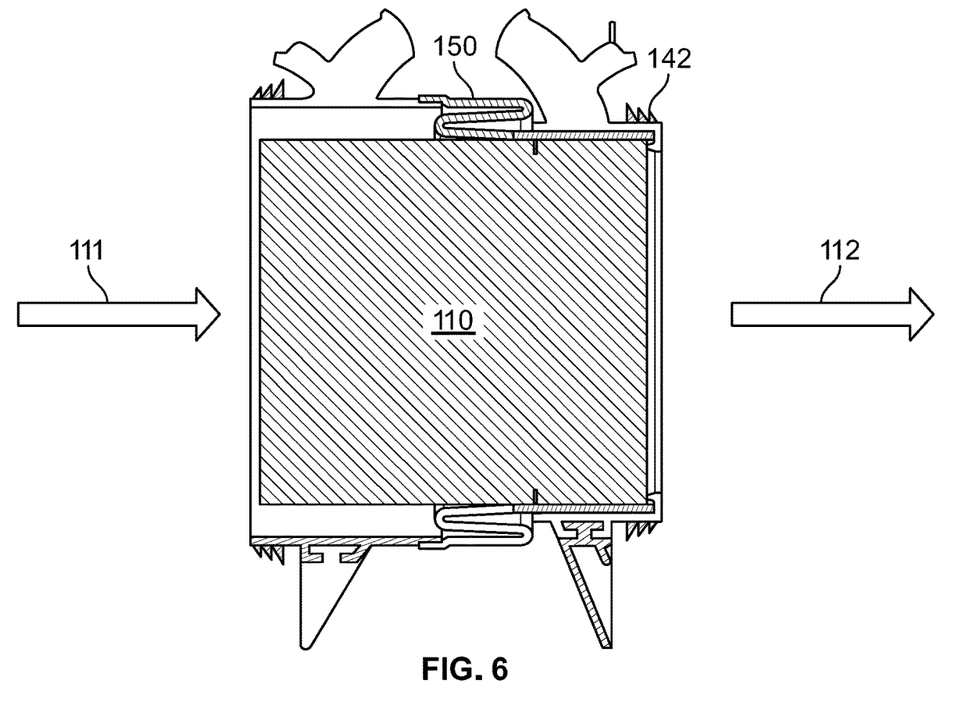
FIG. 6 presents a cross-section of the air filter element of FIG. 5.

FIGS. 5 and 6 present an air filter element 100 according to a third embodiment of the present invention. For reasons of conciseness, only the differences with the first embodiment will be described hereinafter.

In this embodiment, the air filter element 100 further comprises a bellows 150 arranged at a judiciously chosen point between the first coupling element 131 and the second coupling element 132, the bellows 150 enabling the relative movement of the first coupling element 131 and the second coupling element 132. While FIGS. 5 and 6 show an embodiment having a bellows 150 presenting a single pair of folds, this is done without loss of generality.

Figure 7:
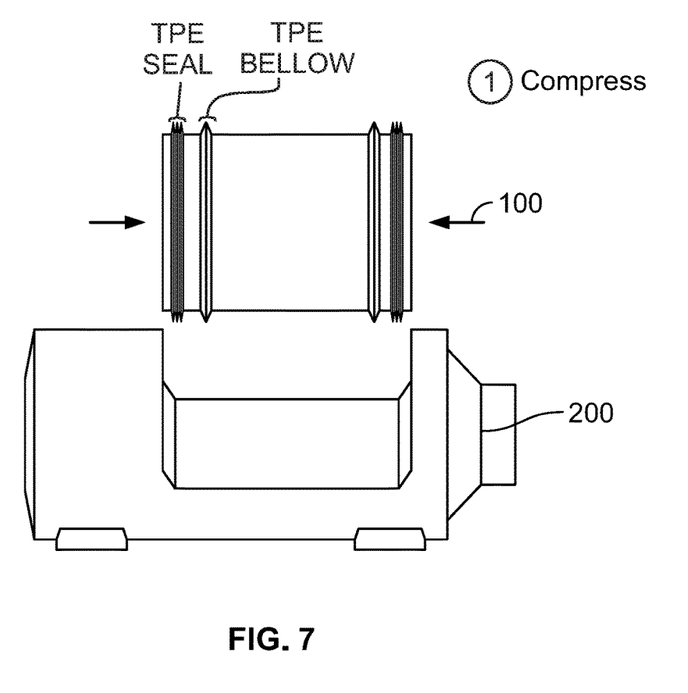
FIG. 7 represents an air filter element according to a fourth embodiment of the present invention.

FIG. 7 represents an air filter element 100 according to a fourth embodiment of the present invention. For reasons of conciseness, only the differences with the first embodiment will be described hereinafter.

In this embodiment, the air filter element 100 further comprises bellows 150 arranged between the first coupling element 131 and the main body 115 of the element 100 and/or between the main body 115 of the element 100 and the second coupling element 132, the bellows 150 enabling the relative movement of the first coupling element 131 and the second coupling element 132. The main body 115 is typically part of the air filter element 100 that contains the filter medium pack 115, which may optionally be provided with an outer shell to provide rigidity and protection. The bellows may be made of thermoplastic elastomers (TPE), as indicated, or any other suitable material, presenting any suitable number of folds. As indicated on FIG. 7, the air filter element 100 can be shortened by compressing the bellows 150 by means of lateral force (i.e., forces exerted on both sides to achieve axial compression) in order to insert it into the air filter system housing 200.

Figure 8:
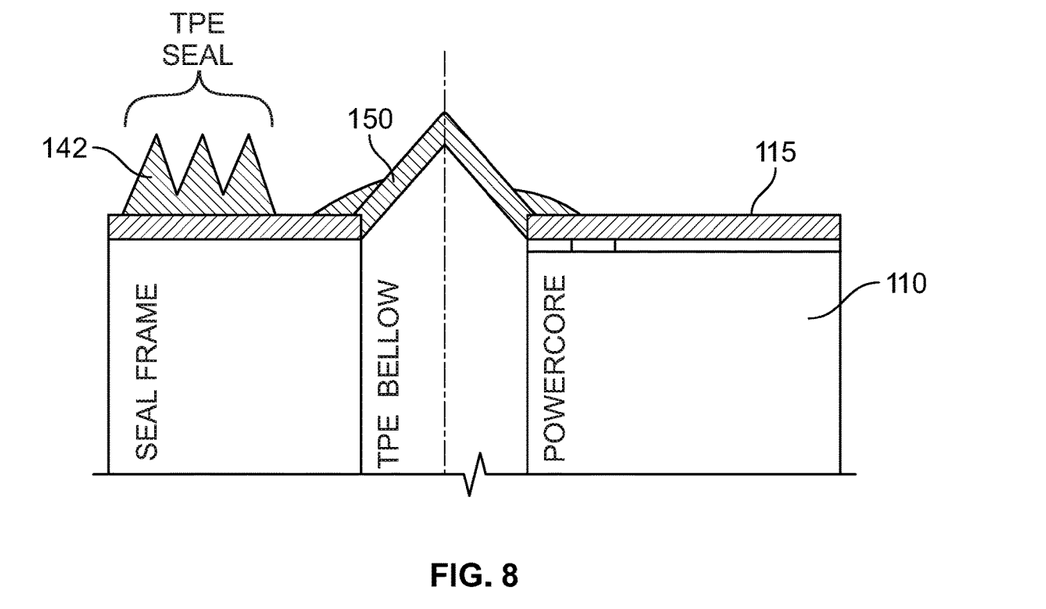
FIG. 8 presents a detail of the air filter element of FIG. 7, in its shortened position.

FIG. 8 presents a detail of the air filter element 100 according to the fourth embodiment, in its shortened position. The seal 142 on the adjacent coupling element 131/132 is also shown. The illustrated seal is an inverted radial seal. The seal 142 may be made of thermoplastic elastomers (TPE), as indicated, or any other suitable material.

Figure 9:
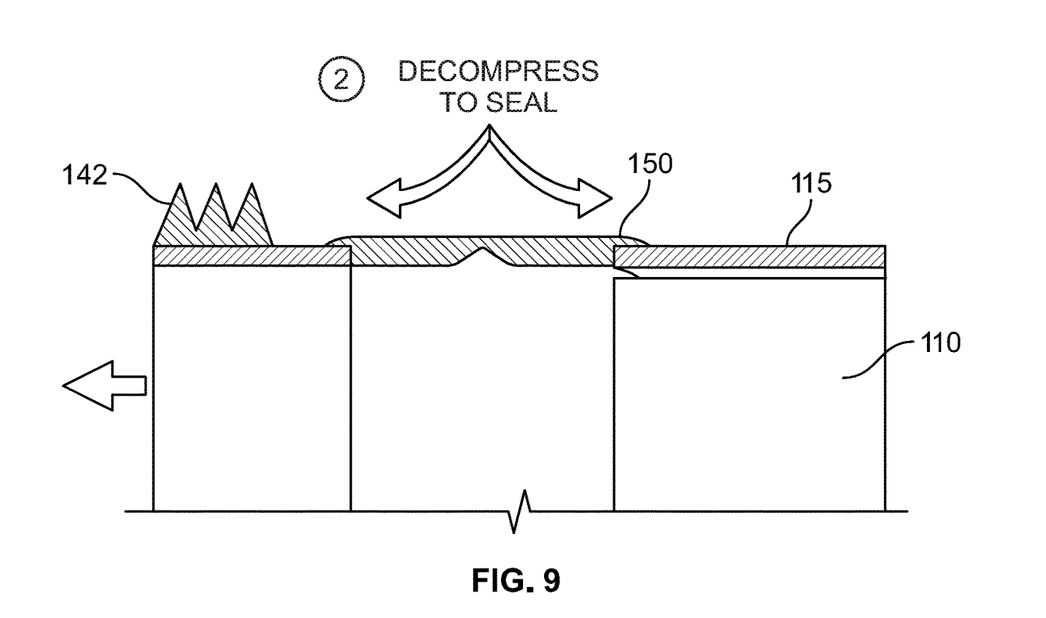
FIG. 9 presents a detail of the air filter element of FIG. 7, in its extended position.

FIG. 9 presents a detail of the air filter element 100 according to the fourth embodiment, in its extended position. The extended position may be reached by exerting pressure on the folded portion of the bellows 150, or by the action of guiding means or gripping means as will be explained in connection with FIG. 12.

Figure 10:
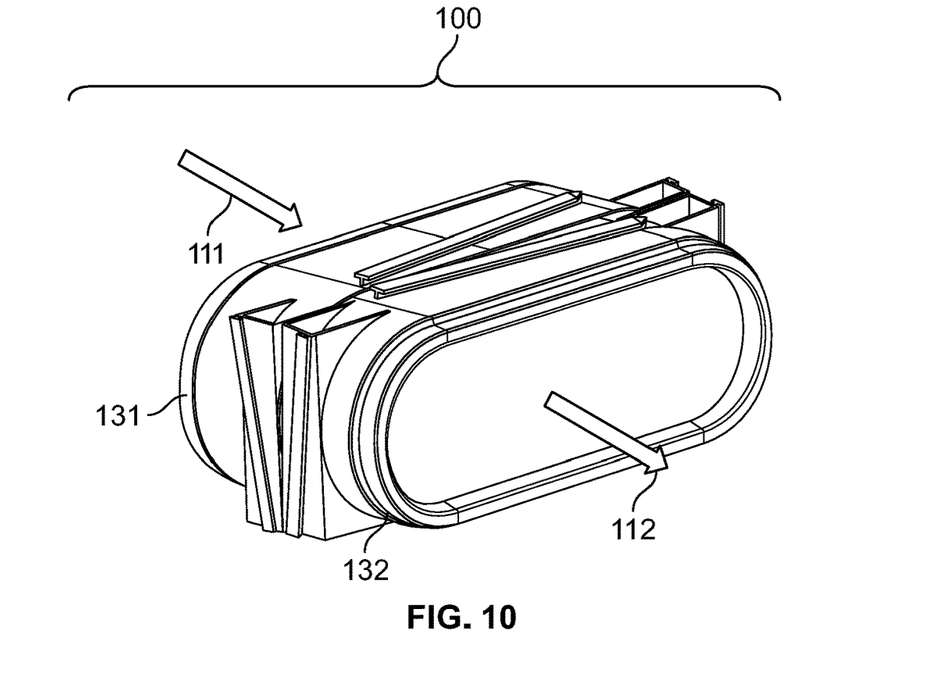
FIG. 10 presents a perspective view of a fifth embodiment of the air filter element according to the present invention, also referred to as the "wedge embodiment"
Figure 11:
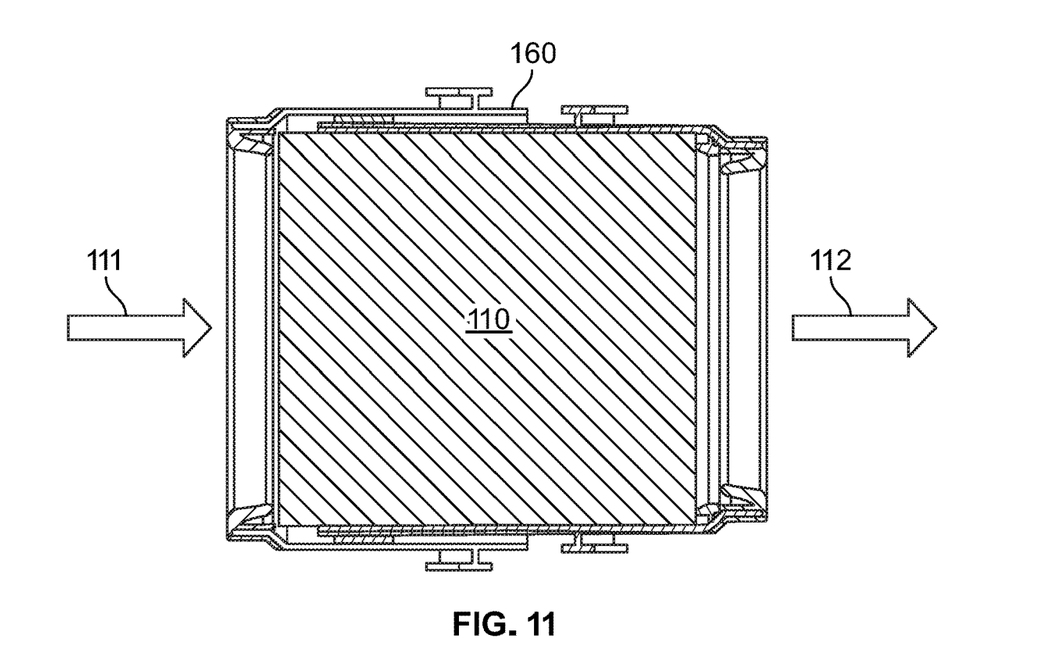
FIG. 11 presents a cross-section of the air filter element of FIG. 10.

FIGS. 10 and 11 present an air filter element 100 according to a fifth embodiment of the present invention. For reasons of conciseness, only the differences with the first embodiment will be described hereinafter.

In this embodiment, the air filter element 100 comprises a telescopic arrangement 150 arranged at a judiciously chosen point between the first coupling element 131 and the second coupling element 132, the telescopic arrangement 150 enabling the relative movement of the first coupling element 131 and the second coupling element 132.

While FIGS. 10 and 11 show an embodiment having a telescopic arrangement 160 presenting a single sliding component, this is done without loss of generality.

Figure 12A:
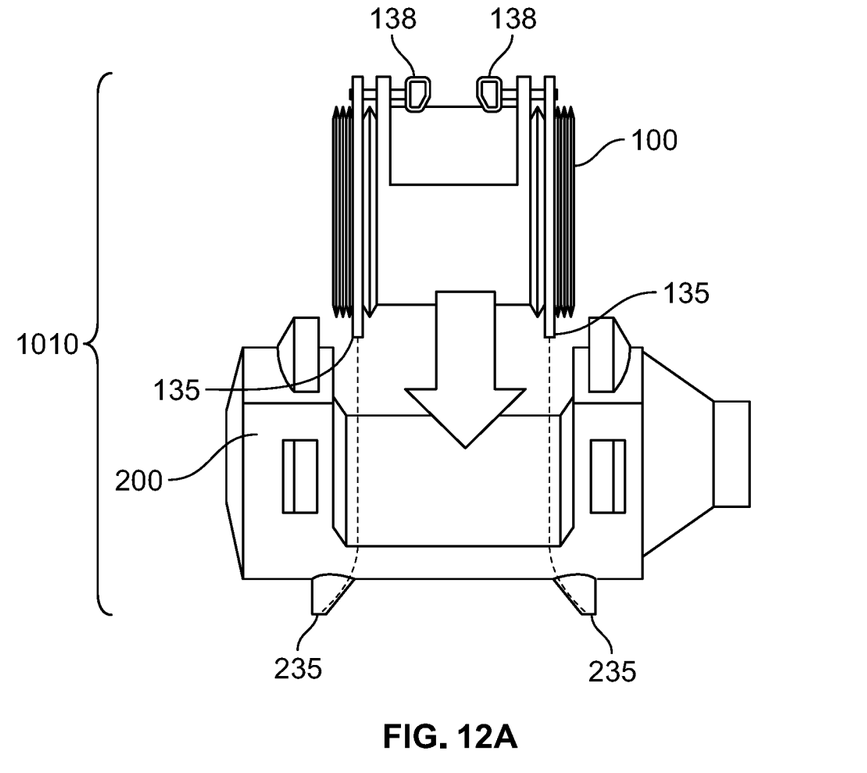
FIGS. 12A-12C schematically illustrates the steps of an embodiment of the method according to the present invention in an embodiment of the system according to the present invention.
Figure 12B:
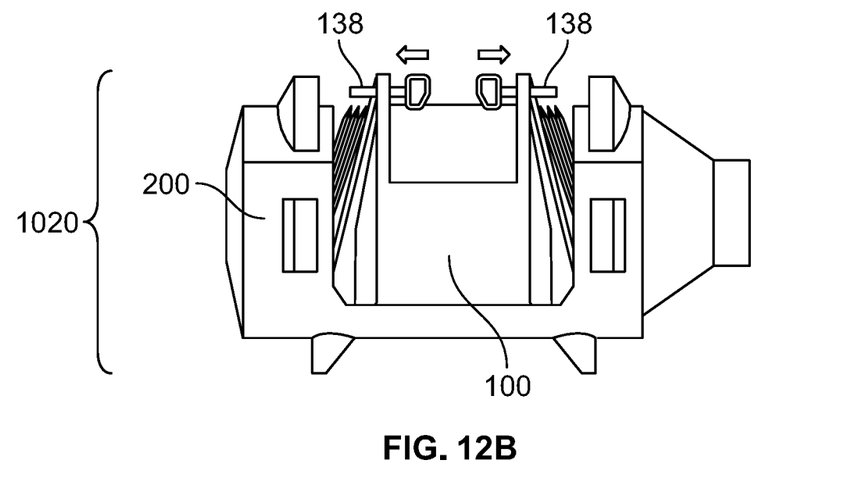
Figure 12C:
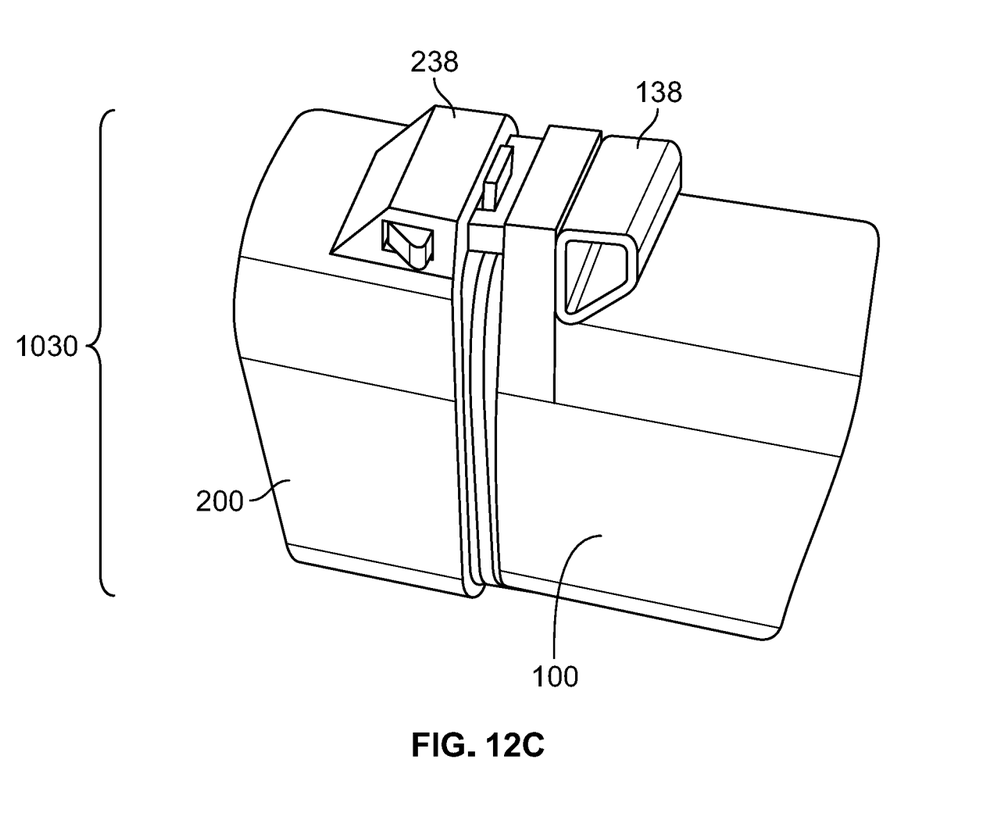

The present invention also pertains to an air filter system and a method of servicing an air filter system, which will be described with reference to FIG. 12 (while not all elements are indicated with figure references in FIG. 12, figure references used in the previous figures are mentioned where relevant).

An embodiment of the air filter system according to the present invention comprises a housing 200 and a removable air filter element 100 as described above, wherein the housing 200 comprises a sealing surface configured to engage with the sealing means 141 so as to provide a sealed fluid communication between the air outlet side 112 of the air filter element 100 and a clean air channel of the air filter system. The housing 200 is configured to cooperate with the guiding means 135 to bring the air filter element 100 from the shortened position into the extended position during the insertion of the air filter element 100 into the air filter system housing 200; to this end, the housing 200 may be equipped with corresponding internal guides 235. The housing 200 is further configured to cooperate with the latching means 138 of the air filter element 100 to latch the air filter element 100 in the extended position; to this end, the housing 200 may be equipped with corresponding latch receivers 238.

The present invention also pertains to a method of servicing an air filter system having a service opening, the method comprising:
 inserting 1010 an air filter element 100 as described above, initially in the shortened position, through the service opening;
 extending 1020 the air filter element 100 to its extended position during or after the inserting; and
 operating 1030 the latching means to latch the air filter element 100 in the extended position when it is fully inserted in the air filter system.

The extending 1020 of the air filter element 100 may occur partially or wholly by cooperating between a guiding element on the air filter element and the filter system housing, or it may be performed completely manually.

While the invention has been described hereinabove with reference to particular embodiments, this was done to clarify and not to limit the invention, the scope of which is to be determined by reference to the accompanying claims.

The invention claimed is:

1. An air filter element comprising:
 a filter medium pack comprising a filter medium, said filter medium pack having an air inlet side and an air outlet side;
 a first coupling element arranged on said air inlet side and a second coupling element arranged on said air outlet side;
 wherein sealing means configured to cooperate with a sealing surface of an air filter system housing are provided on at least one of said first coupling element and said second coupling element; and
 wherein said air filter element is configured to allow relative movement of said first coupling element and said second coupling element between a shortened position and an extended position.

2. The air filter element of claim 1, further comprising a reversibly deformable collar arranged between said air outlet side of said filter medium pack and said second coupling element, said reversibly deformable collar having a first diameter at said air outlet side and a second diameter at said second coupling element, said second diameter being greater than said first diameter wherein folding a first part of said reversibly deformable collar having a greater diameter over a second part of said reversibly deformable collar having a smaller diameter enables said relative movement of said first coupling element and said second coupling element.

3. The air filter element of claim 1, further comprising a reversibly deformable collar arranged between said air outlet side of said filter medium pack and said second coupling element, said reversibly deformable collar having a first diameter at said air outlet side and a second diameter at said second coupling element, said second diameter being smaller than said first diameter; wherein folding a first part of said reversibly deformable collar having a smaller diameter under a second part of said reversibly deformable collar having a greater diameter enables said relative movement of said first coupling element and said second coupling element.

4. The air filter element of claim 1, further comprising a bellows arranged between said first coupling element and said second coupling element, said bellows enabling said relative movement of said first coupling element and said second coupling element.

5. The air filter element of claim 4, further comprising a main body between said first coupling element and said second coupling element, wherein said bellows is arranged between said first coupling element and said main body.

6. The air filter element of claim 4, further comprising a main body between said first coupling element and said second coupling element, wherein said bellows is arranged between said second coupling element and said main body.

7. The air filter element of claim 4, further comprising a main body between said first coupling element and said second coupling element, wherein said bellows is arranged between axially separated parts of said main body.

8. The air filter element of claim 1, further comprising a telescopic arrangement arranged between said first coupling element and said second coupling element, said telescopic arrangement enabling said relative movement of said first coupling element and said second coupling element.

9. The air filter element of claim 1, wherein said sealing means comprises a radial seal arranged on said second coupling element.

10. The air filter element of claim 1, further comprising guiding means configured to cooperate with the air filter system housing so as to at least partially bring the air filter element from its shortened position into the extended position during the insertion of the air filter element into the air filter system housing.

11. The air filter element of claim 10, further comprising gripping means arranged for transmitting a manual force to a part of said air filter element, that is not brought into its extended position by said guiding means, so as to fully bring the air filter element into the extended position.

12. The air filter element of claim 1, further comprising latching means configured to cooperate with said air filter system housing so as to latch said air filter element in said extended position when said air filter element is installed in said air filter system housing.

13. An air filter system comprising a housing and the removable air filter element of claim 10;
 wherein said housing comprises a sealing surface configured to engage with said sealing means so as to provide a sealed fluid communication between said air outlet side of said air filter element and a clean air channel of said air filter system; and
 wherein said housing is configured to cooperate with said guiding means to bring said air filter element from said shortened position into said extended position during the insertion of said air filter element into the air filter system housing and/or with a latching means of said air filter element to latch said air filter element in said extended position.

14. A method of servicing an air filter system having a service opening, the method comprising:
   inserting the air filter element of claim 1, initially in said shortened position, through said service opening;
   extending said air filter element to its extended position during or after said inserting; and
   operating a latching means to latch said air filter element in said extended position when it is fully inserted in said air filter system.

15. A filter element comprising:
   a) a filter medium pack including a filter medium, said filter medium pack having an air inlet side and an air outlet side;
   b) a radial seal member disposed on a positionable coupling element circumscribing at least a portion of the filter medium pack;
   c) wherein the filter element has a first axial length when the positionable coupling element is in an extended sealing position and has a second axial length when the positionable coupling element is in a collapsed position, wherein the first axial length is greater than the second axial length, wherein the radial seal member faces in a first radial direction in both the extended and collapsed positions.

16. The filter element of claim 15, wherein the filter element further comprises a second radial seal member disposed on a second positionable coupling element circumscribing at least a portion of the filter medium.

17. The filter element of claim 15, wherein the radial seal member includes one or more radially extending lip seals.

18. The filter element of claim 15, wherein further comprising:
   a) an operable latch member for moving the positionable coupling element from the collapsed position to the extended sealing position.

19. A filter element comprising:
   a filter medium pack including a filter medium, said filter medium pack having an air inlet side and an air outlet side;
   a radial seal member disposed on a positionable coupling element circumscribing at least a portion of the filter medium pack;
   wherein the filter element has a first axial length when the positionable coupling element is in an extended sealing position and has a second axial length when the positionable coupling element is in a collapsed position, wherein the first axial length is greater than the second axial length;
   a radially protruding tab arranged on the positionable coupling element, the radially protruding tab being for engaging with a portion of an air cleaner housing to move the positionable coupling element from the collapsed position to the extended sealing position.

20. The filter element of claim 19, wherein the radially protruding tab includes a pair of radially protruding tabs.

* * * * *